(12) United States Patent
Clark et al.

(10) Patent No.: US 10,864,665 B2
(45) Date of Patent: Dec. 15, 2020

(54) INJECTION MOLDS INCLUDING VERTICAL SNAP-GATE DEVICES AND METHODS FOR PRODUCING MOLDED ARTICLES USING THE SAME

(71) Applicant: ESSILOR INTERNATIONAL, Charenton-le-Pont (FR)

(72) Inventors: Gary S. Clark, Dallas, TX (US); David J. Rys, Dallas, TX (US); Nattapop Napkun, Bangkok (TH); Timothy Holton, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/889,488

(22) Filed: Feb. 6, 2018

(65) Prior Publication Data
US 2018/0222094 A1 Aug. 9, 2018

(30) Foreign Application Priority Data

Feb. 6, 2017 (EP) .................................. 17305133

(51) Int. Cl.
*B29C 45/00* (2006.01)
*B29C 33/38* (2006.01)
(Continued)

(52) U.S. Cl.
CPC .......... *B29C 45/0003* (2013.01); *B29C 33/38* (2013.01); *B29C 45/27* (2013.01);
(Continued)

(58) Field of Classification Search
CPC . B29C 45/0003; B29C 45/2708; B29C 45/27; B29C 33/38; B29C 45/0046;
(Continued)

(56) References Cited

U.S. PATENT DOCUMENTS 3,021,568 A * 2/1962 Scott, Jr. ................. B29C 45/27
264/328.14
5,523,044 A * 6/1996 Wombwell .......... B29C 33/0061
264/328.8

(Continued)

FOREIGN PATENT DOCUMENTS

| JP | H01156019 | 6/1989 |
|----|-----------|--------|
| JP | 3096066 | 10/2000 |
| JP | 2003062863 | 3/2003 |

OTHER PUBLICATIONS

Search Report and Written Opinion issued in European Application No. 17305133.5, dated Jul. 21, 2017.

*Primary Examiner* — Anthony Calandra
*Assistant Examiner* — Elisa H Vera
(74) *Attorney, Agent, or Firm* — Norton Rose Fulbright US LLP

(57) ABSTRACT

Disclosed are injection molds, injected molded articles, and methods for using the same. The injected molds include a mold cavity and an injection molding conduit having a first end, a second end defining an outlet in fluid communication with the mold cavity, a first interior transverse dimension that is perpendicular to a longitudinal axis of the injection molding conduit, a second interior transverse dimension that is perpendicular to the longitudinal axis and to the first interior transverse dimension, and at the second end, the second interior transverse dimension is at least three times larger than the first interior transverse dimension, and the second interior transverse dimension of the injection molding conduit is substantially aligned with a thickness of a portion of the mold cavity that is adjacent to the outlet of the injection molding conduit.

11 Claims, 3 Drawing Sheets

(51) Int. Cl.
*B29C 45/27* (2006.01)
*B29C 45/17* (2006.01)
*B29L 11/00* (2006.01)

(52) U.S. Cl.
CPC ...... *B29C 45/2708* (2013.01); *B29C 45/0046* (2013.01); *B29C 45/1769* (2013.01); *B29C 2045/0034* (2013.01); *B29C 2045/2714* (2013.01); *B29K 2995/0094* (2013.01); *B29L 2011/0016* (2013.01)

(58) Field of Classification Search
CPC ........ B29C 45/1769; B29C 2045/2714; B29C 2045/0034; B29L 2011/0016; B29K 2995/0094
See application file for complete search history.

(56) References Cited

U.S. PATENT DOCUMENTS

| | | | |
|---|---|---|---|
| 6,077,470 A * | 6/2000 | Beaumont | B29C 45/2701 264/297.2 |
| 2005/0033237 A1 * | 2/2005 | Fentress | A61M 25/0009 604/165.03 |
| 2006/0093700 A1 * | 5/2006 | Naito | B29D 11/00413 425/542 |
| 2014/0319707 A1 * | 10/2014 | Watanabe | B29D 11/00009 264/1.1 |

* cited by examiner

INJECTION MOLDS INCLUDING VERTICAL SNAP-GATE DEVICES AND METHODS FOR PRODUCING MOLDED ARTICLES USING THE SAME

BACKGROUND

A. Field of the Invention

The present invention relates generally to injection molding, and more specifically, but not by way of limitation, to injection molds and an injected molded article for ophthalmic lenses including vertical snap-gate devices and methods for producing molded articles using the same.

B. Description of Related Art

Injection molding is a technology commonly used for high-volume manufacturing of parts made from, most commonly, thermoplastic polymers. During an injection molding process, a solid plastic resin is introduced to an injection molding machine that melts the resin under heat, pressure, and shear. The molten resin is then injected into a mold cavity having a particular shape. The injected plastic is held under pressure in the mold cavity and is cooled until the injected plastic forms a solidified part having a shape that essentially duplicates the shape of the mold cavity. The cooled part can then be ejected from the mold along with hardened gate(s) and runner(s) that supplied the molten resin into the mold cavity. Injection molded parts often show evidence of the injection molding process by including gate(s), parting line(s), flash, and/or the like. Frequently, such parts require post-ejection processing in order to remove such gate(s), parting line(s), flash, and/or the like for functional and/or aesthetic purposes.

Injection molded parts often show evidence of the injection molding process including the presence of parting lines, sprues, gates, and ejector pin marks on the final part. Frequently, molded parts require the gate and runner systems and other appendages to be mechanically removed after ejection for functional and/or aesthetic purposes. Traditionally, injection molded ophthalmic lenses are prepared with thin gates that are typically either fanned wide and flat or fanned large in both directions. These gate appendages are often thinner than the part edge, can bend during ejection, and require further clipping and trimming. Addressing these deficiencies for injection molding of ophthalmic lenses would increase the overall efficiency of the process.

The documents JP H01 156 019 describes for instance a method capable of rapidly breaking and separating a molded product from a molding finished article without using an edge tool or laser beam. The documents US 2006/093700 describes an optical component molding apparatus for simultaneously producing a plurality of optical components.

SUMMARY

Some embodiments of the present injection molds and injected molded articles, at least via including a vertical snap-gate device, provide solutions to problems associated with injection molding of ophthalmic lenses. In particular, a vertical snap-gate is provided that is robust enough for lens ejection and manipulation, and permits appendage-free de-gating that mitigates further post ejection lens processing. In addition, the vertical snap-gate can reduce the need for post-ejection part processing (e.g., edging, cutting, cleaning, finishing, removal of gate(s), parting line(s), flash, and/or the like), thereby increasing the efficiency of the injection molding process, providing for injection molded parts with increased function and/or improved aesthetics, and/or the like.

In some embodiments of the present injection molds, a clean ejection molding part edge can be provided after gate removal, post processing of the part edge such as mechanical gate cutting and/or edging to remove remaining appendages can be reduced or eliminated, and/or the injection molding part can be ejected without gate deformation due to a thin gate cross-section.

In some embodiments of the present injection molds, the longitudinal axis of the snap-gate can be parallel to the ejection axis of the injection mold, resulting in increased rigidity, allowing for the gate to be bent perpendicular to a direction of the fracture, and resulting in a clean de-gating. The snap-gate device can also provide a hanging tab useful for post molding manipulation, such as for applying hard coatings. The snap-gate can be provided with angled side jets that allow for increased turbulence and mixing of the molten molding material prior to injection into the mold which prevents lens defects caused by flow and filling through the gate. The snap-gate device can also reduce scrap molding material.

Especially, the injection molds according to the invention comprise: a mold cavity, and an injection molding conduit having a first end, a second end defining an outlet in fluid communication with the mold cavity, a first interior transverse dimension that is perpendicular to a longitudinal axis of the injection molding conduit, and a second interior transverse dimension that is perpendicular to the longitudinal axis and to the first interior transverse dimension wherein, at the second end, the second interior transverse dimension is at least two times larger than the first interior transverse dimension;
  wherein the second interior transverse dimension of the injection molding conduit is substantially aligned with a thickness of a portion of the mold cavity that is adjacent to the outlet of the injection molding conduit and comprising:
  first and second cavities extending from opposing sides of and in fluid communication with the injection molding conduit;
  wherein each of the cavities is defined in part by a surface that extends between the injection molding conduit and a periphery of the cavity;
  wherein, for each of the cavities:
    the surface is angularly disposed at a non-perpendicular angle relative to a plane that is aligned with the longitudinal axis of the injection molding conduit and bisects the injection molding conduit; and/or
    a line that extends along the surface in a direction from the first end of the injection molding conduit and toward the second end of the injection molding conduit is angularly disposed at a non-perpendicular angle relative to the longitudinal axis.

In some embodiments, at the second end the second interior transverse dimension is at least two to six times larger than the first interior transverse dimension.

In some embodiments, two or more mold portions that are movable relative to one another between an open state and a closed state in which the mold portions cooperate to define the mold cavity. In some embodiments, the second interior transverse dimension is substantially aligned with a direction in which the mold portions move relative to one another between the open state and the closed state.

In some embodiments, the second interior transverse dimension is larger than a thickness of a portion of the mold cavity that is adjacent to the outlet of the injection molding conduit.

In some embodiments, the second interior transverse dimension is between approximately 110% and approximately 200% of a thickness of a portion of the mold cavity that is adjacent to the outlet of the injection molding conduit.

In some embodiments, the first interior transverse dimension decreases along the injection molding conduit in a direction from the first end and toward the second end. In some embodiments, the second interior transverse dimension increases along the injection molding conduit in a direction from the first end and toward the second end.

In some embodiments, each of the cavities has a thickness that tapers toward the second end of the injection molding conduit.

In some embodiments, each of the cavities is spaced from the outlet of the injection molding conduit in a direction aligned with the longitudinal axis of the injection molding conduit and by a distance that is approximately 0.5 or more millimeters (mm).

The present invention also relates to an injected molded article comprising: a product, a runner, and a gate having first end coupled to the runner and a second end coupled to the product. In particular, the second end of the gate comprises: a first transverse dimension that is perpendicular to a longitudinal axis of the gate, and a second transverse dimension that is perpendicular to the longitudinal axis and to the first transverse dimension. Especially, the second transverse dimension is at least two times or at least six times larger than the first transverse dimension. In particular, the second transverse dimension is substantially aligned with a thickness of a portion of the product that is adjacent to the second end of the gate. According to the invention, first and second tabs extend from opposing sides of the gate. In particular, each of the tabs is defined in part by a surface that extends between the gate and a periphery of the tab. Especially, for each of the tabs: the surface is angularly disposed at a non-perpendicular angle relative to a plane that is aligned with the longitudinal axis of the gate and bisects the gate, and/or a line that extends along the surface in a direction from the first end of the gate and toward the second end of the gate is angularly disposed at a non-perpendicular angle relative to the longitudinal axis.

In some embodiments of the present injected molded article, the second end of the gate extends beyond a portion of the product that is adjacent to the second end in a direction that is aligned with the second transverse dimension.

In some embodiments of the present injected molded article, the second transverse dimension is between approximately 110% and approximately 200% of a thickness of a portion of the product that is adjacent to the second end of the gate.

In some embodiments of the present injected molded article, the product comprises an ophthalmic lens.

Some embodiments of the present methods for producing an injected molded article using the injection mold comprise: injecting injection molding material through the injection molding conduit and into the mold cavity.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those one or more elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/have/include/contain—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

DETAILED DESCRIPTION

Figure 1:
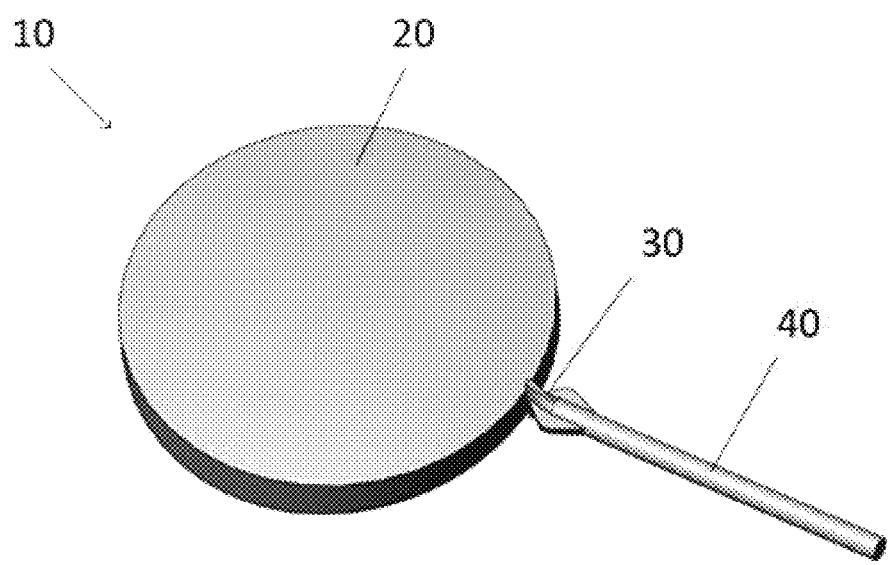
FIG. 1 is a perspective view of an embodiment of an injection mold according to the present invention including a vertical snap-gate connecting a mold cavity/product and a runner portion.

A preferred embodiment of the invention is illustrated in FIG. 1, which shows a perspective view of an injection mold 10. Injection mold 10 can include two or more mold portions (not shown in the figure) that define a mold cavity 20. At least one of the mold portions of injection mold 10 can be moved relative to at least one other of the mold portions between an open state and a closed state. Injection mold 10 has an injection molding conduit which can include a runner portion 40 and a gate portion 30, where, when an injection molded article is formed within injection mold 10, the runner portion 40 forms at least a portion of a runner of the molded article, and the gate portion 30 forms at least a portion of a gate of the molded article.

The injection molding conduit is configured to convey injection molding material via the runner portion 40 and the gate portion 30 into the mold cavity 20 of the injection mold 10. The injection molding conduit can be defined, for example, by at least two mold portions (not shown in the figure) when the mold portions are in the closed state. While FIG. 1 shows a cylindrical shaped injection molding conduit having a predetermined diameter, it will be appreciated that other geometrical configurations and/or cross-sections suitable for conveying injection molding material is within the scope of the present invention. Indeed, according to alternative example embodiments, e.g., square, triangular, or any other suitably appropriate geometric shapes of the injection molding conduit are possible.

Gate portion 30 is positioned between runner portion 40 and mold cavity 20 and forms a transition area between the runner portion 40 and mold cavity 20. In some embodiments, gate portion 30 can be formed from the cooling and/or hardening of a molten injection molding material within the injection mold conduit having corresponding structure. Gate portion 30 used in the present invention as illustrated in FIG. 1, is shown in more detail as gate 100 in FIGS. 2-6.

Figure 2:
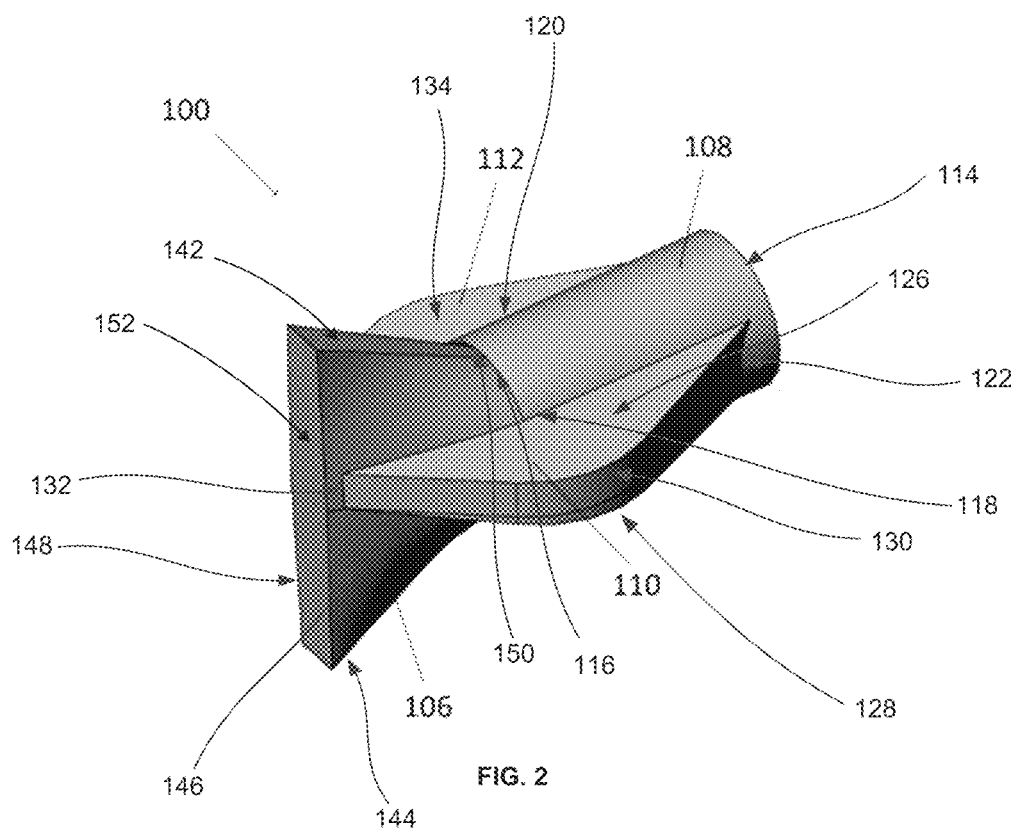
FIG. 2 is a perspective view of an embodiment of a vertical snap-gate according to the present invention.

As seen in FIG. 2, gate 100 includes a sub-runner portion 108, a first tab 110, a second tab 112, and a wing portion 106. Sub-runner portion 108 conveys injection molding material from runner portion 40 to the mold cavity 20 of the injection mold 10. Sub-runner portion 108 is substantially cylindrical and extends in a longitudinal direction of gate 100 from a first end surface 114 in communication with runner portion 40 to a second end surface 116 in communication with wing portion 106. Sub-runner portion 108 is positioned between an inner surface 118 of first tab 110 and an inner surface 120 of second tab 112, and extends past a first end surface 122 of first tab 110.

First tab 110 and second tab 112 protrude from two opposite surfaces of sub-runner portion 108 and wing portion 106, and extend therefrom in a first direction (first interior transverse dimension) that is substantially perpendicular to the longitudinal direction of gate 100. First tab 110 includes a top surface 126, a bottom surface 128 opposite to the top surface 126, an outer surface 130, inner surface 118 opposite to the outer surface 130, first end surface 122, and a second end surface 132 opposite to first end surface 122. Second tab 112 includes in view of FIG. 2 a top surface 134 and inner surface 120.

Wing portion 106 includes a top surface 142, a bottom surface 144 opposite to the top surface 142, a first side surface 146, a second side surface 148 opposite to first side surface 146, first end surface 150, and a second end surface 152 opposite to first end surface 150.

As seen in FIG. 2, first tab 110 is curved along a length of first tab 110 from first end surface 122 to second end surface 132 so as to define a structure of varying thickness and width. First tab 110 is curved in the first direction such that it has a greater width near a center portion and a smaller width near end surfaces 122 and 132. Like first tab 110, second tab 112 is also curved along a length of second tab 112 so as to define a structure of varying thickness and width. Like first tab 110, second tab 112 is also curved in the first direction such that it has a greater width near a center portion and a smaller width near end surfaces.

Wing portion 106 extends in the longitudinal direction from the first end surface 150 in communication with sub-runner portion 108 to the second end surface 152 in communication with mold cavity 20 of the injection mold 10. In addition, wing portion 106 extends in a second direction (second interior transverse dimension) that is perpendicular to both the first direction and the longitudinal direction from bottom surface 144 to top surface 142. Bottom surface 144 and top surface 142 taper toward each other from the second end surface 152 to the first end surface 150.

The dimensions of the injection molding conduit can converge moving through the conduit such that at, or near, the second end 116, the second interior transverse dimension can be 2.0-10.1 times larger than the first interior transverse dimension. In an alternative embodiment, the second interior transverse dimension can be greater than 10.1 times larger than the first interior transverse dimension. The second interior transverse dimension of the injection molding conduit can be substantially aligned with a thickness of a portion of mold cavity 20 that is adjacent to the outlet of the injection molding conduit and/or the second interior transverse dimension can be substantially aligned with a direction in which the mold portions move relative to one another between the open state and the closed state.

In some embodiments, the second end 116 defining an outlet in fluid communication with mold cavity 20 can be larger than the thickness of a lens such that the second interior transverse dimension can be larger than a thickness of a portion of mold cavity 20 that is adjacent to the outlet of the injection molding conduit. When the second end outlet is larger, cooling time of an injection molding material may be increased. In some instances, the second interior transverse dimension can be between approximately 110% and approximately 200% of a portion of a thickness of mold cavity 20 that is adjacent to the outlet of the injection molding conduit.

In some embodiments, the first interior transverse dimension of the conduit decreases along the injection molding conduit in a direction from the first end 114 and toward the second end 116 and the second interior transverse dimension increases along the injection molding conduit in a direction from the first end 114 and toward the second end 116.

In some embodiments, the first interior transverse dimension at, or near, the second end 152 of gate portion 30 of the injection molding conduit is approximately 1.0 mm to 3.0 mm, preferably, approximately 1.5 mm to 2.2 mm. This first interior transverse dimension can be adjusted in relation to the second interior transverse dimension to allow for optimum lens edge filling volumes and faster cooling times. The perpendicular orientation of gate portion 30 in relation to the lens thickness can permit increase rigidity parallel to the ejection axis of the injection mold. Additionally, a thin first interior transverse dimension permits gate portion 30 to be bent in one direction (e.g., about an axis running parallel with the second interior transverse dimension) and snapping off cleanly from the lens, when necessary.

In some embodiments, the length of the sub-runner portion 108 of the injection mold conduit can be 25% to 75% the second interior transverse dimension at the second end outlet. Preferably, the length from the sub-runner portion 108 is approximately 50% the second interior transverse dimension to prevent heat loss and defects in the lens. The sub-runner portion can be equal to or greater than the lens thickness (e.g., up to 30% greater). As molten material is conveyed from the sub-runner portion 108 to the gate portion 30, a choke area can be formed allowing a more uniform filling of mold cavity 20. In some embodiments, the sub-runner portion 108 can be further be coupled to a runner system. The runner system can include the injection mold conduit and can convey molten molding material into the sub-runner portion 108. The injection mold conduit can have the same or substantially the same first and second traverse dimensions as the sub-runner portion 108, and can be in fluid communication, and be reversibly coupled.

Figure 3:
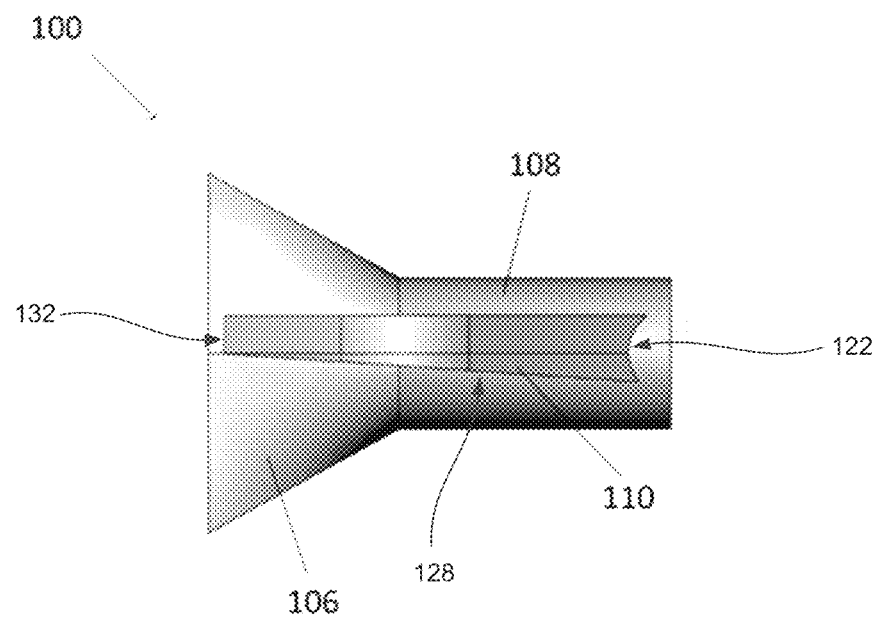
FIG. 3 is a first side view of an embodiment of a vertical snap-gate according to the present invention.

FIG. 3 shows a first side view of first tab 110. Bottom surface 128 of first tab 110 is angularly inclined from the first end surface 122, which is positioned below a midpoint of runner portion 108 and wing portion 106, to the second end surface 132, which is situated at the midpoint of runner portion 108 and wing portion 106. As a result, a thickness of first tab 110 is largest at the first end surface 122 and smallest at the second end surface 132.

Figure 4:
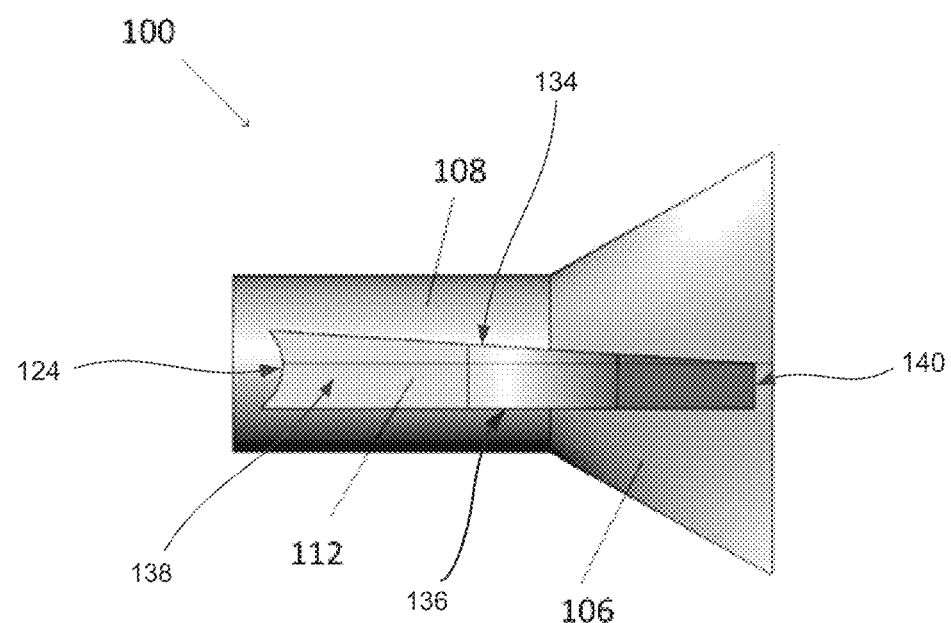
FIG. 4 is a second side view of an embodiment of a vertical snap-gate according to the present invention.

FIG. 4 shows a second side view of second tab 112. Second tab 112 includes a top surface 134, a bottom surface 136 opposite to the top surface 134, an outer surface 138, a first end surface 124, and a second end surface 140 opposite to first end surface 124. Top surface 134 of second tab 112 is angularly inclined from the first end surface 124, which is positioned above a midpoint of runner portion 108 and wing portion 106 to the second end surface 140, which is situated at the midpoint of runner portion 108 and wing portion 106. As a result, a thickness of first tab 110 is largest at the first end surface 124 and smallest at the second end surface 140.

As shown in FIGS. 2-4, first end surfaces 122 and 124 have a curved surface profile which can be concave, while second end surfaces 132 and 140 have a straight surface profile.

Figure 5:
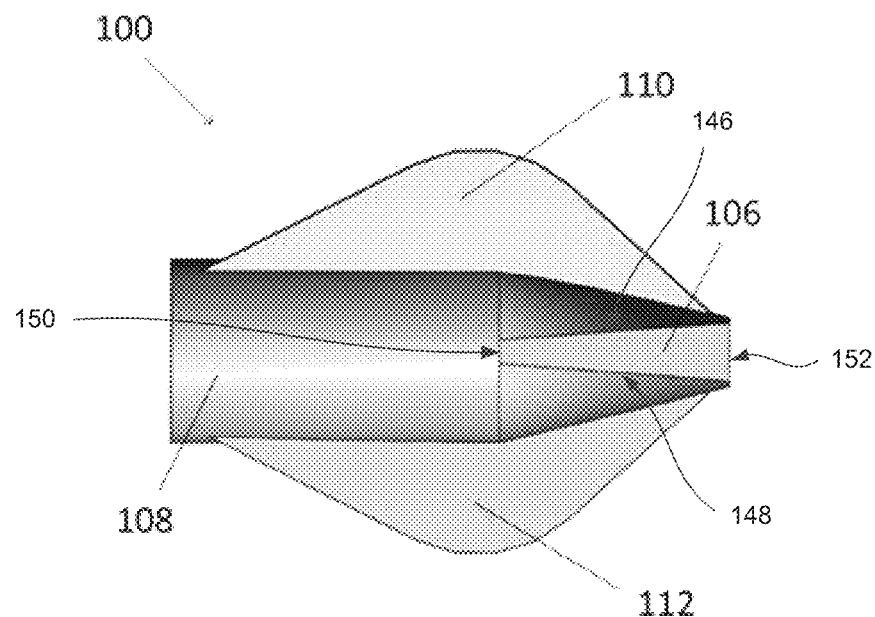
FIG. 5 is a top view of an embodiment of a vertical snap-gate according to the present invention.

FIG. 5 illustrates a top view of gate 100. First side surface 146 and second side surface 148 of wing portion 106 taper toward each other from the second end surface 152 to the first end surface 150.

Figure 6:
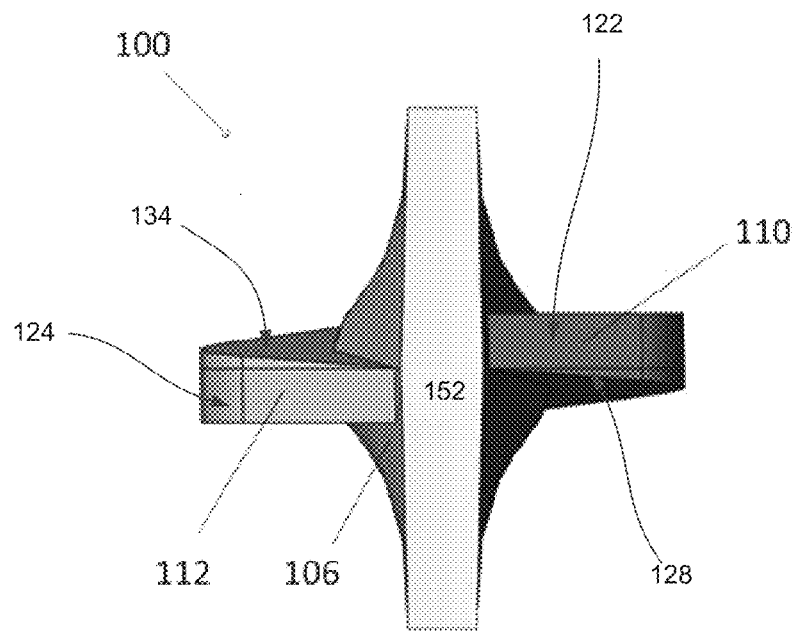
FIG. 6 is a rear view of a vertical snap-gate of an embodiment according to the present invention.

FIG. 6 shows a rear view of gate 100. First tab 110 is positioned above the midpoint of wing portion 106 near second end surface 152 of wing portion 106, and second tab 110 is positioned below the midpoint of wing portion 106 near second end surface 152 of wing portion 106. Bottom surface 128 of first tab 110 is angularly inclined downward from the first end surface 122 of first tab 110 to below the midpoint and then terminates at the second end surface 132 of first tab 110. Top surface 134 of second tab 112 is angularly inclined upward from the first end surface 124 of second tab 112 to above the midpoint and then terminates at the second end surface 140 of first tab 112.

In some embodiments, the injection mold conduit includes angled side cavities that permit increased turbulence and mixing of the molten molding material prior and/or during injection into the mold cavity 20. During the injection molding, a portion of the molten material flow in the injection mold conduit can be diverted through the periphery of the cavities and back into the conduit at opposing angles from both sides and at a slight angle creating a vortex action. In one aspect, the injection mold conduit includes first and second cavities extending from opposing sides of, and in fluid communication with, the injection molding conduit. Each of the cavities can be defined in part by a surface that extends between the injection molding conduit and a periphery of the cavity.

In some embodiments, the surface can be angularly disposed at a non-perpendicular angle relative to a plane that can be aligned with the longitudinal axis of the injection molding conduit and can bisect the injection molding conduit and/or a line that extends along the surface in a direction from the first end of the injection molding conduit and toward the second end of the injection molding conduit can be angularly disposed at a non-perpendicular angle relative to the longitudinal axis. In some instances, the surface can be angularly disposed and/or the line that extends along the surface can be angularly disposed from approximately 1 degrees to approximately 89 degrees. Preferably, the surface can be angularly disposed and/or the line that extends along the surface can be angularly disposed from approximately 2 degrees to approximately 10 degrees. More preferably, the surface can be angularly disposed and/or the line that extends along the surface can be angularly disposed approximately 4 degrees from the horizontal axis. In addition, each of the wing portions can be angularly disposed approximately 29 degrees from the horizontal axis. The first and second cavities can terminate before the lens edge to create a small snap-gate portion for freeze off and adequate room for bending to de-gate. The gate also can also permit runner/sub-runner systems to be designed to reduce scrap molding material such that each of the cavities is spaced from the outlet of the injection molding conduit in a direction aligned with the longitudinal axis of the injection molding conduit and by a distance that can be 0.1 to 2.9 millimeters (mm), preferably, approximately 0.5 mm to 2.9 mm. The jets can terminate before the lens edge to create a small snap-gate portion for freeze off and adequate room for bending to de-gate.

In some embodiments, the injection molded article can include a product, a runner portion, and a gate portion. The gate portion can include a first end coupled to the runner portion and a second end coupled to the product (e.g., ophthalmic lens) where the gate portion is wider than the thickness of the product.

In some embodiments, the gate portion can include a first tab and a second tab that are formed by the cavities that permit increased turbulence and mixing of the molten molding material prior and/or during to injection into the mold. In some aspects, an injected molded article containing the gate portion can include the first tab and the second tab extending from opposing sides of the gate portion wherein each of the tabs is defined in part by a surface that extends between the gate and a periphery of the tab. Each of the tabs can include a surface that is angularly disposed at a non-perpendicular angle relative to a plane that is aligned with the longitudinal axis of the gate and bisects the gate and/or a line that extends along the surface in a direction from the first end of the gate and toward the second end of the gate is angularly disposed at a non-perpendicular angle relative to the longitudinal axis.

Typical injection molding materials include small beads or pellets of meltable plastics and/or resins that can be forcefully injected under heat and pressure into a mold cavity. An injection molding material can include a thermoplastic material, such as polyethyleneimine, polyetherimide, or a derivative thereof, polyethylene terephthalate, polycarbonate, polybutylene terephthalate, poly(1,4-cyclohexylidene cyclohexane-1,4-dicarboxylate), glycol-modified polycyclohexyl terephthalate, poly(phenylene oxide), polypropylene, polyethylene, polyvinyl chloride, polystyrene, polymethyl methacrylate, thermoplastic elastomer, terephthalic acid elastomer, poly(cyclohexanedimethylene terephthalate), polyethylene naphthalate, polyamide (e.g., PA6, PA66, and/or the like), polysulfone sulfonate, polyether ether ketone, polyether ketone, acrylonitrile butyldiene styrene, polyphenylene sulfide, polycarbonate/polybutylene succinate, a co-polymer thereof, or a combination thereof. A thermoplastic injection molding material can comprise a blend of high, medium, and low molecular polymers, yielding a multi-modal or bi-modal blend. Such a multi-modal material can have superior flow properties as well as satisfactory enema/physical properties. Preferably, the thermoplastic material is chosen for molding ophthalmic lenses, for example, polycarbonate.

An injection molding material can include a thermoset material, such as unsaturated polyester resin, polyurethane, bakelite, duroplast, urea-formaldehyde, diallyl-phthalate, epoxy resin, epoxy vinylester, polyimide, cyanate ester of polycyanurate, dicyclopentadiene, benzoxazine, a co-polymer thereof, or a combination thereof.

An injection molding material can comprise a blend of polymeric and non-polymeric materials. For example, a thermoplastic injection molding material can comprise a blend of a polymer and one or more small molecule additives. Such a small molecule could be, for example, a siloxane or other lubricating molecule that, when added to the thermoplastic material, improves the flowability of the polymeric material. Other additives may include inorganic fillers such as calcium carbonate, calcium sulfate, talcs, clays (e.g., nanoclays), aluminum hydroxide, $CaSiO_3$, glass formed into fibers or microspheres, crystalline silicas (e.g., quartz, novacite, crystallobite), magnesium hydroxide, mica, sodium sulfate, lithopone, magnesium carbonate, iron oxide, and/or organic fillers such as rice husks, straw, hemp fiber, wood flour, or wood, bamboo, or sugarcane fiber. An injection molding material can be filled (e.g., with fibers) or unfilled.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. An injection mold comprising: a mold cavity; and an injection molding conduit having:
   a cylindrical portion having a diameter that defines a first end of the conduit and a flared wing portion that defines a second end of the conduit;
   the second end defining an outlet in fluid communication with the mold cavity and comprising a first dimension that is larger than the diameter and a second dimension that is perpendicular to the first dimension, wherein the first dimension is at least two times larger than the second dimension, and wherein the first dimension is substantially aligned with a thickness of a portion of the mold cavity that is adjacent to the outlet of the injection molding conduit; and
   first and second cavities extending from opposing sides of and in fluid communication with the injection molding conduit;
   wherein each of the cavities is defined in part by a surface that extends from the cylindrical portion and the flared wing portion of the injection molding conduit and a periphery of the cavity;
   wherein each of the cavities extend outwardly from the cylindrical portion and the flared wing portion of the injection molding conduit; and wherein, for each of the cavities:
   the surface is angularly disposed at a non-perpendicular angle relative to a plane that is aligned with a longitudinal axis of the injection molding conduit and bisects the injection molding conduit; and/or a line that extends along the surface in a direction from the first end of the injection molding conduit and toward the second end of the injection molding conduit is angularly disposed at a non-perpendicular angle relative to the longitudinal axis.

2. The injection mold of claim 1, wherein at the second end the first dimension is at least two to six times larger than the second dimension.

3. The injection mold of claim 1, comprising:
   two or more mold portions that are movable relative to one another between an open state and a closed state in which the mold portions cooperate to define the mold cavity;
   wherein the first dimension is substantially aligned with a direction in which the mold portions move relative to one another between the open state and the closed state.

4. The injection mold of claim 1, wherein the first dimension is larger than a thickness of a portion of the mold cavity that is adjacent to the outlet of the injection molding conduit.

5. The injection mold of claim 4, wherein the first dimension is between approximately 110% and approximately 200% of a thickness of a portion of the mold cavity that is adjacent to the outlet of the injection molding conduit.

6. The injection mold of claim 1, wherein:
   the second dimension decreases along the injection molding conduit in a direction from the first end and toward the second end; and
   the first dimension increases along the injection molding conduit in a direction from the first end and toward the second end.

7. The injection mold of claim 1, wherein each of the cavities has a thickness that tapers toward the second end of the injection molding conduit.

8. The injection mold of claim 1, wherein each of the cavities is spaced from the outlet of the injection molding conduit in a direction aligned with the longitudinal axis of the injection molding conduit and by a distance that is approximately 0.5 or more millimeters (mm).

9. The injection mold of claim 1, wherein:
a first surface and a second surface, opposite the first surface, define the first dimension.

10. The injection mold of claim 1, wherein:
a third surface and a fourth surface, opposite the third surface, define the second dimension.

11. The injection mold of claim 1, wherein:
the first and second cavities are further defined by:
- a first surface and a second surface, opposite the first surface, wherein the first surface and second surface are effectively parallel to one another; and
- a third surface and a fourth surface, opposite the third surface, wherein the third surface and fourth surface are not parallel to one another.

\* \* \* \* \*